Nov. 26, 1957 L. E. SODERQUIST 2,814,072
APPARATUS FOR THE SHAPING OF HOLLOW DISTENSIBLE STRUCTURE
Filed July 6, 1954 6 Sheets-Sheet 1

INVENTOR.
LESLIE E. SODERQUIST
BY
ATTORNEYS

Nov. 26, 1957  L. E. SODERQUIST  2,814,072
APPARATUS FOR THE SHAPING OF HOLLOW DISTENSIBLE STRUCTURE
Filed July 6, 1954  6 Sheets-Sheet 2
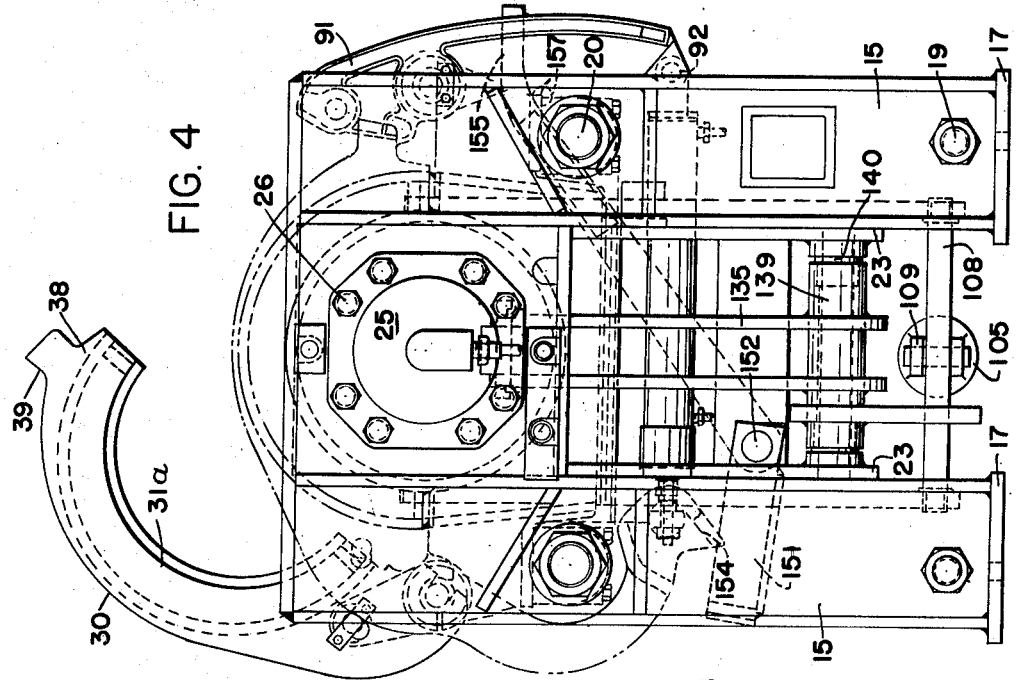
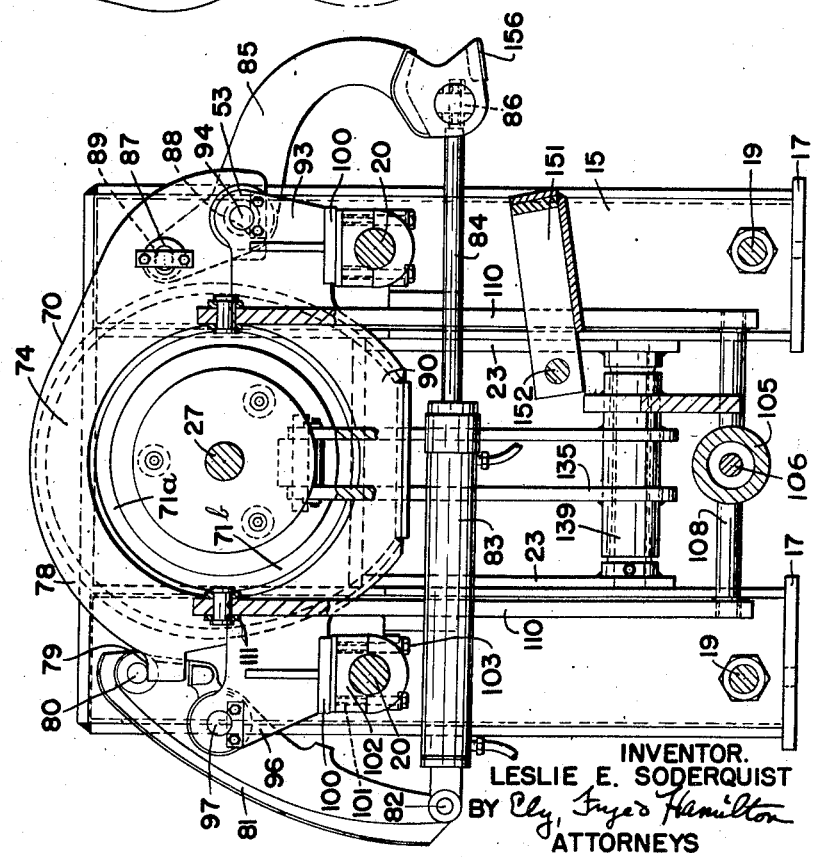
INVENTOR.
LESLIE E. SODERQUIST
BY Ely, Fryer & Hamilton
ATTORNEYS

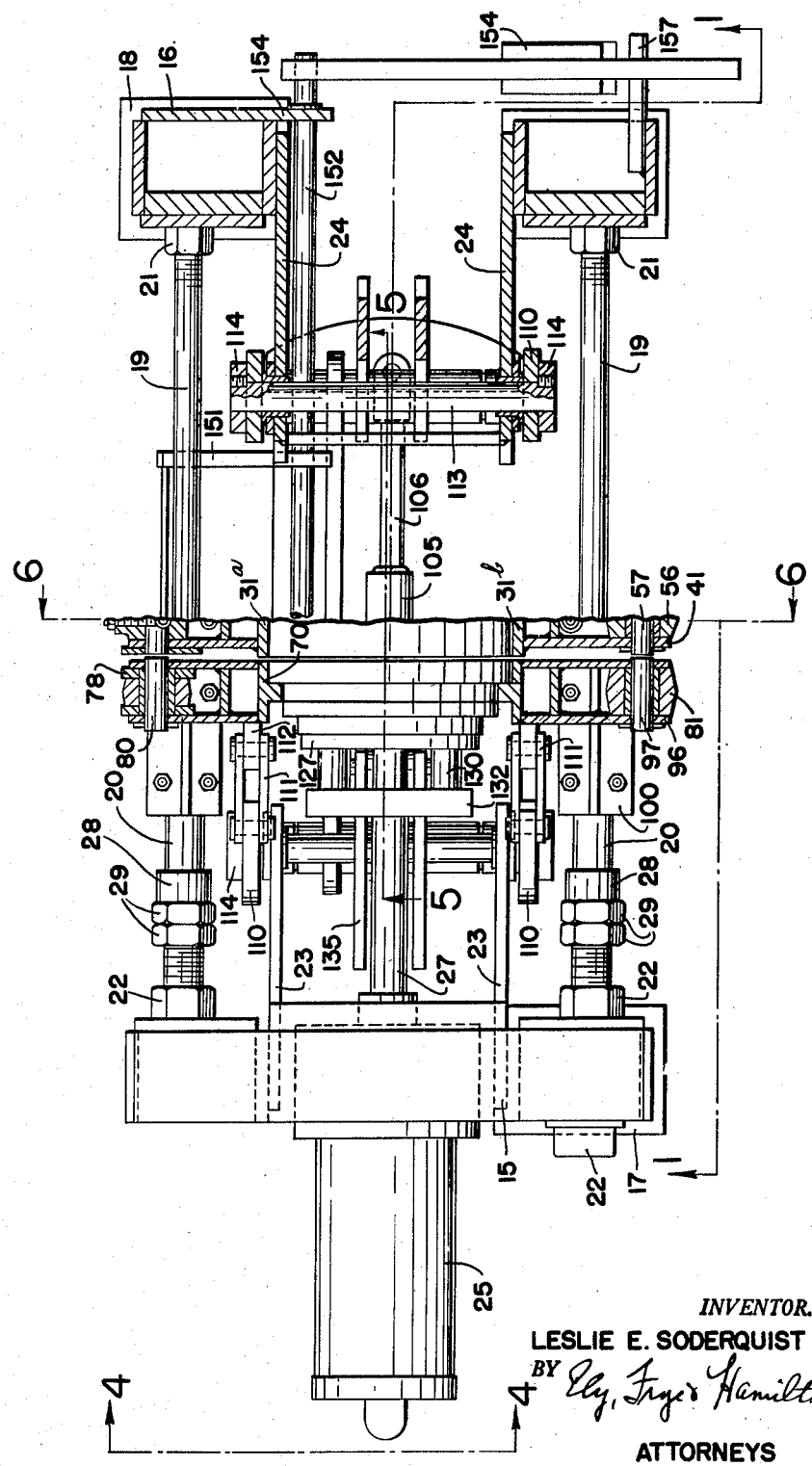

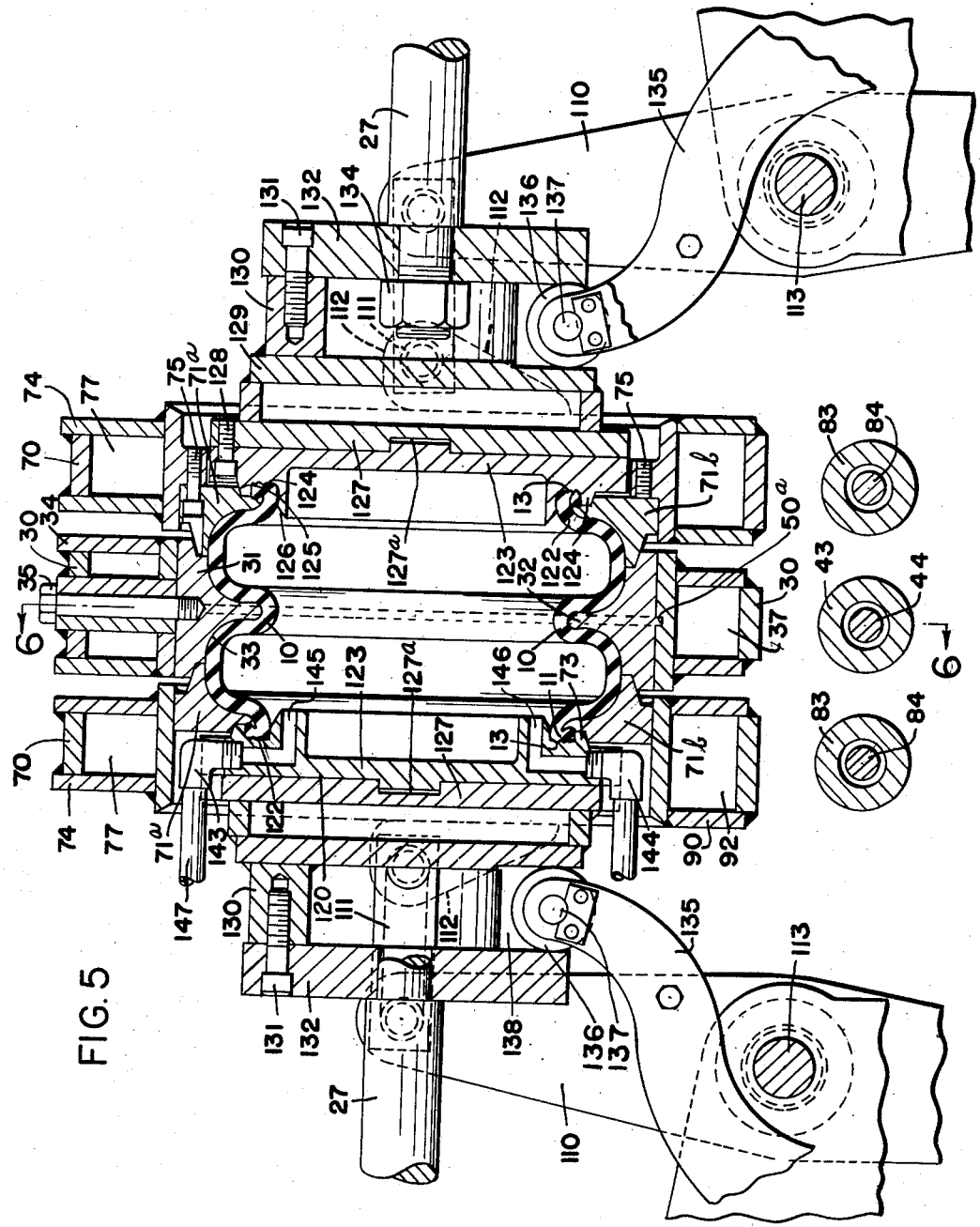

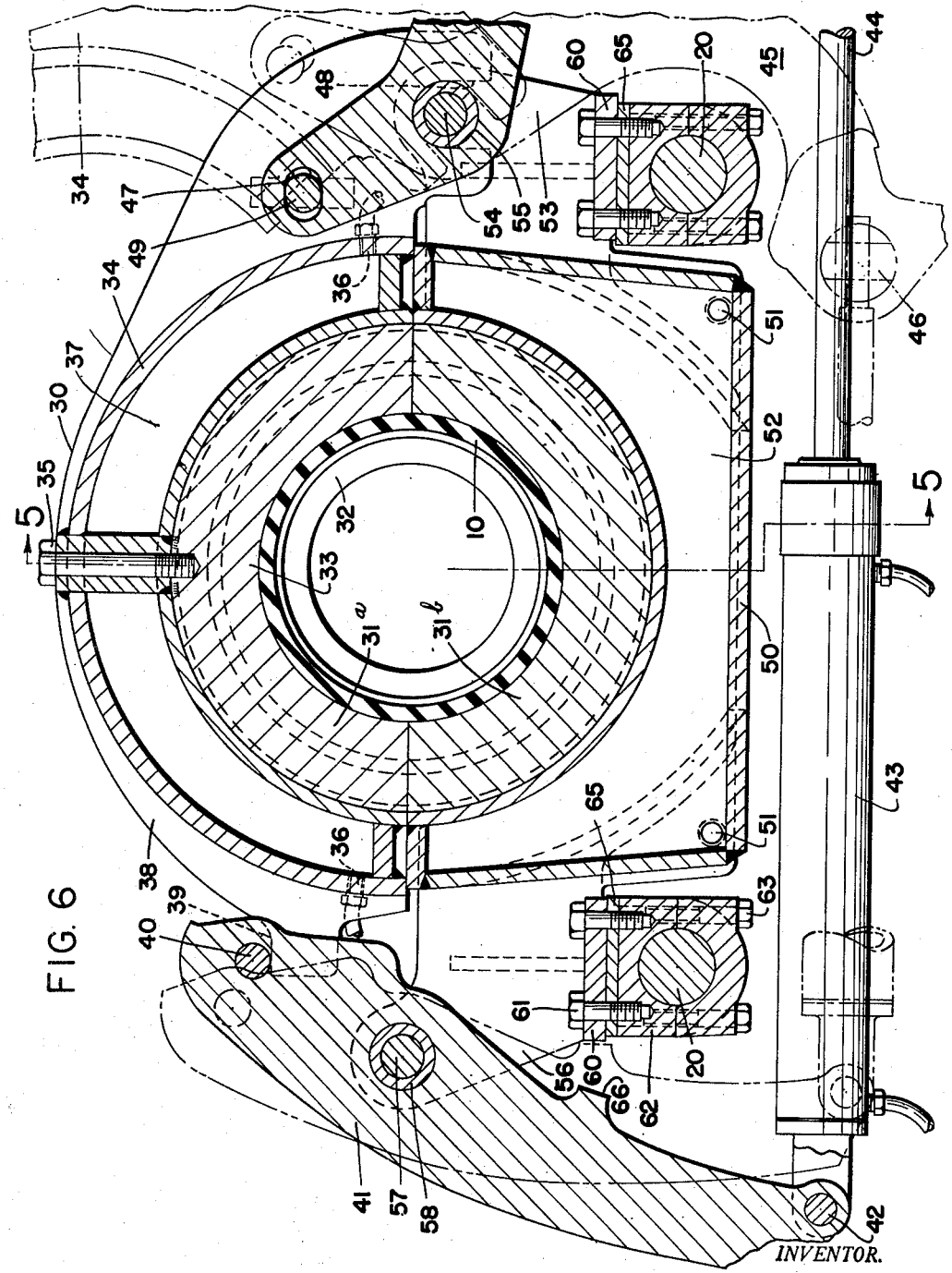

Nov. 26, 1957  L. E. SODERQUIST  2,814,072
APPARATUS FOR THE SHAPING OF HOLLOW DISTENSIBLE STRUCTURE
Filed July 6, 1954  6 Sheets-Sheet 6

*INVENTOR.*
LESLIE E. SODERQUIST
BY
ATTORNEYS

United States Patent Office 2,814,072
Patented Nov. 26, 1957

2,814,072
APPARATUS FOR THE SHAPING OF HOLLOW DISTENSIBLE STRUCTURE

Leslie Edward Soderquist, Akron, Ohio, assignor to The McNeil Machine and Engineering Company, Akron, Ohio, a corporation of Ohio Application July 6, 1954, Serial No. 441,246

4 Claims. (Cl. 18—17)

This invention relates to an apparatus for the shaping and curing of hollow distensible structure. More particularly, this invention relates to an apparatus for the forming and curing of air spring bellows wherein a tubular hollow distensible article is distended to conform with the configuration of a mold cavity, following which the distended article is vulcanized in the same apparatus.

Air spring bellows are widely used in vehicular suspension systems. They are constructed of vulcanized rubber reinforced with plies of fabric cord and are of substantially hollow cylindrical or tubular form.

Prior to the present invention, it was not thought possible to provide a single apparatus wherein an uncured hollow cylinder could be formed to the desired configuration and then cured without removal to a separate vulcanizer. Stated in another way, it was not thought possible to provide a single apparatus which would take an uncured hollow cylinder, shape it into finished form, cure the bellows and produce a completed air spring bellows ready for installation.

One prior art method of forming air spring bellows is illustrated by U. S. Patent 2,265,346, Brown et al., issued December 9, 1941. The apparatus disclosed and claimed therein, though satisfactory by the standards of the art at that time, did not provide for shaping and curing the bellows in a single apparatus and in a single operation and required several steps in its operation, each of which required considerable manual labor the skill of the operator, and was generally slow and inefficient in the forming of the uncured cylinder.

Therefore, it is an object of this invention to provide an improved apparatus for the shaping and curing of hollow distensible structures.

Further, it is an object of this invention to provide an apparatus for the production of air spring bellows wherein an uncured cylinder composed of rubber and fabric is distended to conform with the configuration of a mold cavity following which the distended raw cylinder is subjected to curing temperatures.

Still further, it is an object of this invention to provide an apparatus which does more than merely form an uncured cylinder in the desired configuration, that is, to provide an apparatus which will both shape and cure an air spring bellows in one operation.

Lastly, it is an object of this invention to provide an apparatus which can be safely and satisfactorily operated by semi-skilled operators and which will save considerable time and labor in the manufacture of air spring bellows.

Other objects and advantages of the present invention will be apparent from the following detailed description thereof taken in connection with the attached drawings, in which like numerals refer to like parts, and in which:

Fig. 2 is an end sectional view on line 2—2 of Fig. 1, showing principally the supporting frame, the opening, closing and locking means for the mold sections, the end closure coordinating linkage, and the transverse rods for axially mounting the medial and lateral mold sections.

Figure 1:
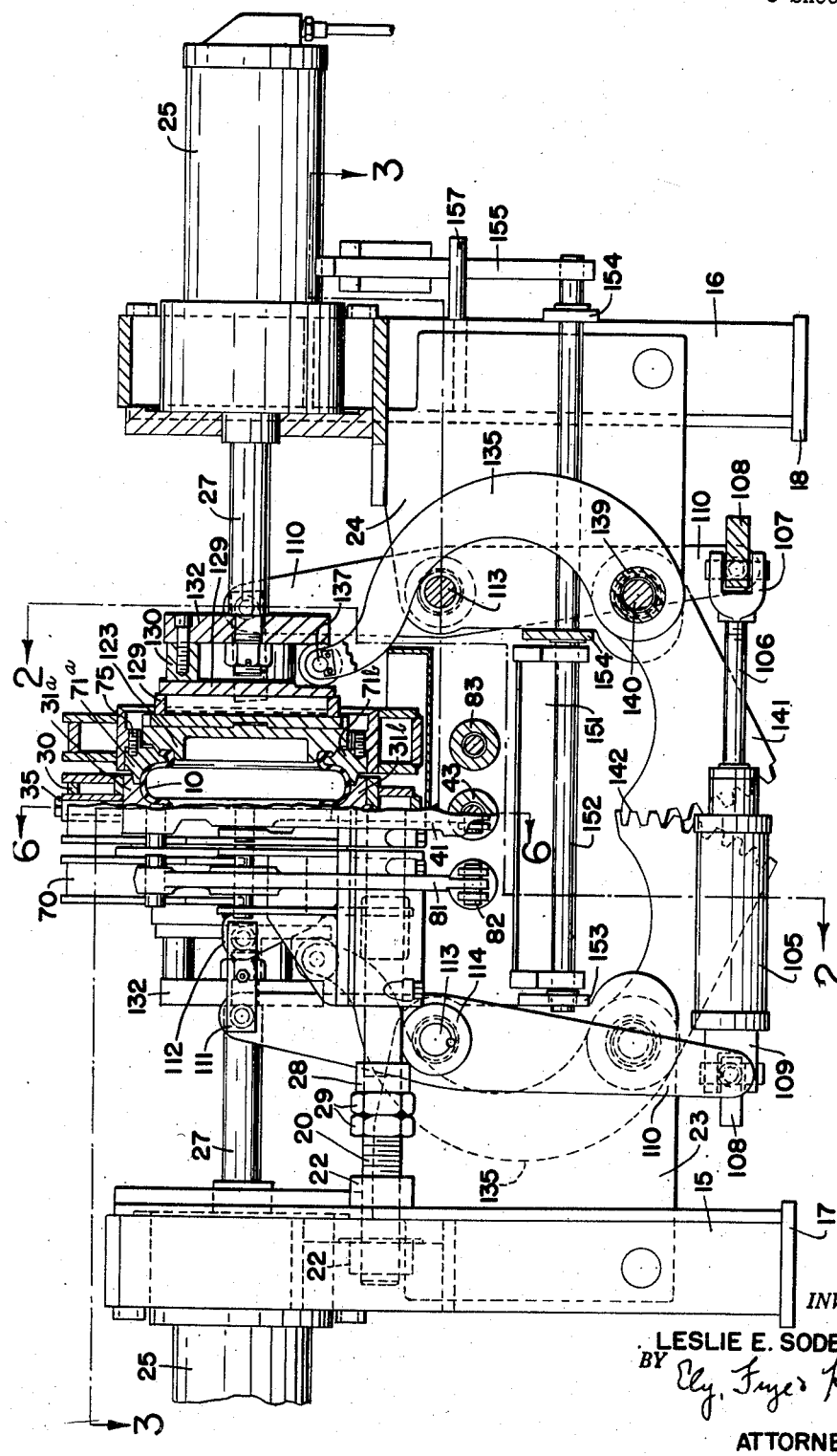
Fig. 1 is a side elevation, part in section, showing the apparatus in the fully "closed" position with an air spring bellows having been formed in the mold cavity.

Fig. 3 is a top plan view, part in section, on broken line 3—3 of Fig. 1, showing principally the supporting frame, the actuating means for the end closures, the heating chambers affixed to the medial or central and lateral mold sections, the transverse mounting rods and the plurality of means for coordinating the end closures and moving the lateral mold sections away from the central section when the mold is fully "open."

Fig. 4 is an end view on line 4—4 of Fig. 3, showing principally the supporting frame and an end closure actuating cylinder.

Fig. 5 is an enlarged sectional view on line 5—5 of Figs. 3 and 6, showing the mold cavity comprising a stationary medial mold section, the movable lateral mold sections and the end closures, and an air spring in position in the closed mold and distended to the configuration of the work cavity.

Fig. 6 is an enlarged sectional end view on lines 6—6 of Figs. 1, 3 and 5, similar to Fig. 2, showing the detailed construction of the stationary medial mold section and the opening, closing and lock means therefor, and the transverse rods for mounting the medial and lateral mold sections.

Figure 7:
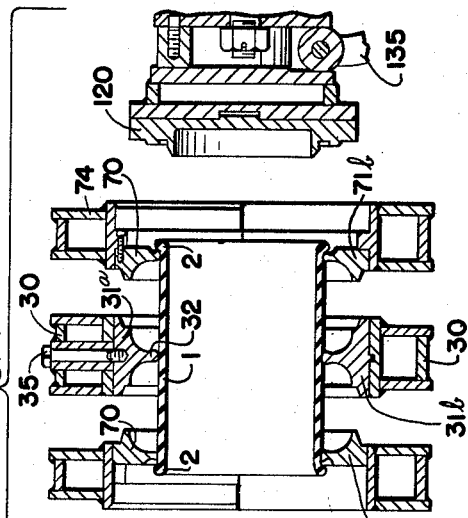
Figure 8:
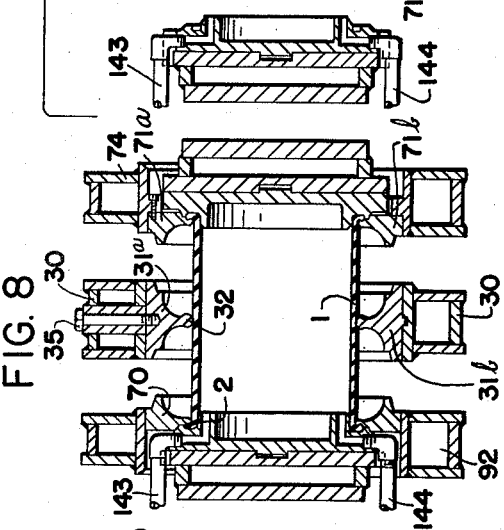
Figure 9:
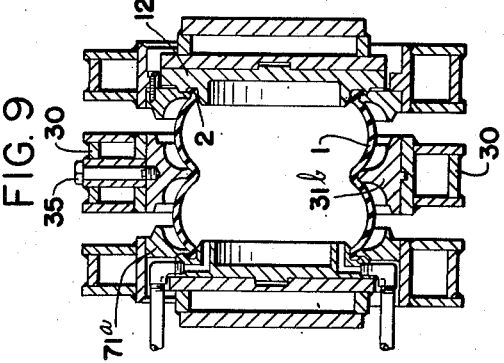

Figs. 7, 8 and 9 show schematically the mold sections and end closures in various positions.

Figure 10:
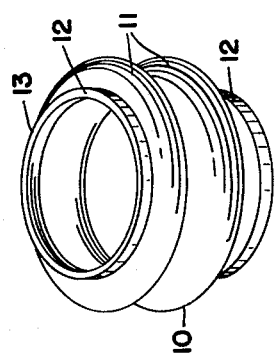

Fig. 10 is a view showing the general configuration of an air spring bellows which may be produced by the practice of this invention.

General description

Referring to Fig. 10, the numeral 10 designates a hollow tubular air spring bellows structure of fabric-reinforced vulcanized rubber composition having distended annular regions 11 at each side of the middle thereof. At each end of bellows 10 is an annular bead 12 having sealing ribs 13 on the outer face thereof.

The apparatus of the present invention comprises a mold cavity adapted to receive an uncured cylinder (which is designated by numeral 1 in Figs. 7, 8 and 9) and form and cure said cylinder when it has been distended to conform with the configuration of the mold cavity. The plurality of mold sections comprising the mold cavity include a medial section, two lateral sections and two end closures, and are supported by a rigid frame.

The vertical end frames are tied together by two pairs of transverse rods. The upper pair of these rods also serve to locate the medial and lateral mold sections with relation to each other. The end closures are affixed to cylinders mounted in the end frames. In the embodiment shown, a total of six cylinders, which may be air or hydraulic, are used.

The largest two cylinders which are mounted one in each end frame, facing toward each other, actuate the end closures by moving them in or out on an axial plane. A single cylinder actuates the lateral sections through a linkage, moving them also in or out on an axial plane. Three identical cylinders are provided to open, close and lock the medial and lateral mold sections.

The sequence of operational steps will now be given, as a brief statement thereof will enable the constructional details to be more readily understood: The medial and lateral mold sections are opened by actuating the three opening, closing and locking cylinders. The end closures are fully retracted away from the lateral sections by actuating the two cylinders mounted in the end frame units. The lateral sections are drawn away from the medial section by actuating the single cylinder mounted near the bottom of the apparatus. The uncured cylinder 1 is then placed in position and the lateral and medial mold sections are closed, as shown by Fig. 7.

Referring now to Fig. 8, the end closures are then tightly aligned with each lateral section by actuating the two large cylinders. An uncured bead 2 at each end of uncured cylinder 1 is gripped between each end closure and lateral section. To ensure the tight gripping of bead 2, the force actuating the cylinder linked to the lateral sections is not released until the bead is tightly gripped by the end closures and lateral sections and both have moved inward.

Referring now to Fig. 9, the cylinders actuating the end closures in an inward direction continue to push inward both the end closures and the lateral sections aligned therewith. This inward movement of the end closures and lateral sections continues until the mold cavity is assembled, which is best shown by Fig. 5.

When the air spring bellows has been formed and cured and the interior drained of water or condensed steam, the end closures are retracted, the three cylinders for opening, closing and locking the medial and lateral mold sections are actuated and the mold cavity is opened.

When the completed bellows has been removed, the lateral sections are moved away from the medial section by actuating the single cylinder and the apparatus is ready to form and cure another air spring bellows.

The movements of the several components which constitute the shaping and curing press and the admission of expanding air or steam and cooling water are all controlled by suitable timing mechanisms which are well known in the art and may be adapted to the operation of this press by anyone skilled in the art. The timing mechanisms, conduits for steam, air and water, valves and the like have not been shown, as they do not constitute any part of the invention and may be supplied as found necessary or advisable.

While the machine is shown as it has been developed for the forming and vulcanizing of air springs, certain features of the invention may be employed in the forming and vulcanizing of other articles.

*Frame and supporting structure*

Referring to Fig. 1, the machine includes vertical frames 15 and 16, which are affixed to base plates 17 and 18. The vertical frames 15 and 16 are supported by a lower pair of transverse rods 19 and an upper pair of transverse rods 20. The ends of each of rods 19 and 20 adjacent to frame 16 are threaded and bolted to the frame by fastening means 21. The end of each of rods 20 adjacent to frame 15 are also threaded and a double fastening means 22 is provided to permit the entire frame structure to be adjusted for alignment as required.

Referring now to Fig. 3, there are rigidly affixed to each leg of frames 15 and 16 and projecting inwardly toward the middle of the apparatus two pairs of support plates 23 and 24. Each pair of the substantially rectangular support plates serve a purpose to be described hereinafter. Mounted in each frame, are two identical cylinders 25, affixed to said frames by fastening means 26. Each cylinder 25 has a piston shaft 27 extending inwardly toward the middle of the apparatus. Near each end of upper rods is a collar 28 held in place by lock nuts 29. These collars serve to limit the outward movement of the lateral mold sections and their positions may be adjusted for various sizes of air springs so that the press is adapted for the curing of a wide range of air spring sizes.

*Medial mold section*

The mold cavity comprises a stationary medial or central mold section, two movable lateral mold sections, and two end closures.

The medial section 30 is an annular transversely divided mold section, rigidly fastened to transverse rods 20 as described hereinafter. Section 30 includes two identical semi-circular sections, 31a being the top section and 31b the bottom section.

When closed sections 31a and 31b form an annular shaped molding surface, having a central rounded rib 32 and two concentric molding surfaces 33 that are disposed radially outwardly of the annular rib and have their inner perimeters joined at opposite points on a horizontal axis through the center of rib 32. The inside diameter of rib 32 is such that it assists in the formation of annular distensions 11 on bellows 10, when the mold cavity is closed.

The upper section 31a has affixed thereto, by a tap bolt 35, a top inner heating chamber 34. Chamber 34 is fitted with conduits 36 to admit and drain heating media, such as steam or hot water, to and from the hollow interior 37 of the chamber.

The heating chamber 34 is provided with two reinforced parallel ribs 38, forming at the front of the chamber horizontal locking surfaces 39. The locking surfaces 39 are engaged with locking bar 40 which is mounted in the upper end of a front inner locking lever 41 which passes between ribs 38, when the mold section 30 is closed with structure 10 in position. Pivoted to the lower end of the locking lever 41 by means of pin 42 is a cylinder 43. The cylinder 43 is a double acting floating cylinder which when actuated opens, closes and locks the medial mold. The piston shaft 44 of cylinder 43 is rotatably fastened to the lower end of a rear inner actuating lever 45 by fastening means 46. At the rear of chamber 34 is an oblong aperture 47 and a pair of downwardly open C-shaped slots 48, which form the pivot for the closing and opening of the upper section 31a of the central mold. Aperture 47 is for the purpose of fastening to chamber 34 the upper end of rear actuating lever 45 by means of pin 49.

The lower section 31b is seated in a bottom inner heating chamber 50 and is located by a retaining groove 50a. Chamber 50 is fitted with conduits 51 to admit and drain heating media to and from the hollow interior 52 of chamber 50, and has a pair of projecting ears 53 at the rear thereof. The ears 53 have cylindrical openings therein into which a pin 54 is firmly inserted. The pin 54, supported in ears 53, is the axis around which the chamber 34 rotates during the opening and closing movements of the medial mold. The actuating lever 45 is rotatably mounted on the middle of pin 54 between ears 53 through bushing 55 in lever 45.

When actuated by the retraction of piston shaft 44, lever 45 rotates on pin 54 which causes pin 49 in aperture 47 to move chamber 34 and upper mold section 31a to the open position, chamber 34 being engaged with pin 49 by C-shaped slots 48 so that the chamber rotates on the axis represented by pin 54 to the dotted line position shown in Fig. 6.

The chamber 50 has an additional pair of projecting ears 56 at the front thereof. The ears 56 have cylindrical openings therein into which a pin 57 is firmly inserted. Pin 57, supported in ears 56, is the axis around which the locking lever 41 of chamber 34 is rotated. The front locking lever 41 is rotatably mounted within ears 56 on pin 57 through bushing 58 in lever 41. The extension of piston shaft 44 causes lever 41 to rotate on pin 57 so that locking bar 40 engages locking surface 39 and secures the medial mold section 30 in a closed annular form.

Rigidly affixed to both sides of chamber 50 in the area below projecting ears 53 and 56 are fastening plates 60. The fastening plates are affixed by bolts 61 to split bearing sleeves 62 which are in turn affixed to transverse rods 20 by bolts 63. Shims 65 may be interposed between the plates 60 and the bearing sleeves 62.

It will be seen that the lower mold section 31b is supported in fixed position on the rods 20 at the center of the press, while the upper mold section is movable about the axis 54 to open and close the central mold. When the central mold is open as shown in dotted lines in Fig. 6, the locking lever 41 is moved to the dotted line position where a stop 66 on the lever strikes the plate 60. To close the mold fluid pressure is admitted to the left hand end of cylinder 43 which will move the rod 44 to the right which actuates the lever 45 and lowers the section 31a into section 31b. When the mold sections are closed together the fluid pressure cannot move the rod 44 outwardly any further and the reaction now moves the cylinder 43 to the left which through the connection 42 swings the locking lever in clockwise direction to engage the bar 40 with the locking surfaces 39, and not only locks but exerts a powerful squeeze at the front of the mold.

It will be observed that when the mold is fully opened the pin 49 is at the front of the slots 47. As the upper half 31a passes dead center in closing, the weight thereof will cause the pin 49 to move to the other end of the slots. However, after the two mold sections have come in contact, continued movement of the lever 45 will cause the pin 49 to advance in the slots 47 to the position shown in full lines in Fig. 6, which will exert a powerful squeeze at the rear of the mold.

To open the medial mold, pressure is admitted to the right hand end of the cylinder 43 and as the mold is then locked, the rod 44 cannot move and the first action is to release the locking lever 41. When the lever 41 has moved to its full extent, as determined by the stop 66, the pressure now reacts in the rod 44, which is moved to the left which lifts the upper mold section 31a to fully open position.

*Lateral mold sections*

The lateral sections 70 are annular transversely divided mold sections, slidably mounted on the transverse rods 20 as described hereinafter. In the preferred embodiment shown, lateral sections 70 are similar with each other so the two sections will be described as one, with any variances in common structures being appropriately designated. Referring now to Fig. 5, a lateral section 70 includes two identical semicircular sections, an upper section 71a and a lower section 71b. When closed together sections 71 form an annular shaped molding surface having a concentric concave molding surface 72 that aligns with surfaces 33 to define a molding cavity for structure 10. Sections 71 also have a circumferential flange 73 which is engaged with bead 11 when end closures 120 are engaged against lateral sections 70.

Referring now to Figs. 2 and 5, an upper section 71a has affixed thereto a top outer heating chamber 74 by a plurality of bolts 75. Chamber 74 is fitted with conduits to admit and drain heating media to and from the hollow interior 77 of a chamber.

Referring now solely to Fig. 2, a heating chamber 74 is provided with two reinforced parallel ribs 78 forming at the front of the chamber horizontal locking surfaces 79. The locking surfaces 79 are engaged with locking bar 80 which is mounted in the upper end of the front outer locking lever 81, which passes between ribs 78 when the lateral mold sections 70 are closed with article 10 in position. Fastened to locking lever 81 by means of pin 82 is the cylinder 83 which is identical with cylinder 43 and when actuated will open, close and lock the lateral mold sections. Piston shaft 84 of each cylinder 83 is pivotally fastened to a rear outer actuating lever 85 by fastening means 86. At the rear of chamber 74 is an oblong aperture 87 and a pair of downwardly open C-shaped slots 88. Aperture 87 is for the purpose of fastening to chamber 74 the rear actuating lever 85 by means of pin 89. The operation of closing and locking and unlocking and opening the lateral chambers is the same as in the case of the medial chamber and need not be further described.

The lower sections 71b are affixed in a bottom outer heating chamber 90. Chamber 90 is fitted with conduits to admit and drain heating media to and from the hollow interior 92 of chamber 90. Each of the chambers 90 has a pair of projecting ears 93 at the rear thereof. The ears 93 have cylindrical openings therein into which a pin 94 is firmly inserted. Pin 94, supported in ears 93, is the axis around which the opening and closing movements of the chambers 74 take place. The actuating lever 85 is rotatably mounted on the middle of pin 94, through opening 95 in lever 85.

The chambers 90 each have an additional pair of projecting ears 96 at the front thereof. The ears 96 have cylindrical openings therein into which a pin 97 is firmly inserted. Pin 97, supported by ears 96, is the axis around which the locking member of chamber 74 is rotated. The front locking lever 81 is rotatably mounted within ears 96 on pin 97. The simultaneous extension of piston shafts 84 causes locking levers 81 to rotate on pin 97, so that the locking bars 80 engage locking surfaces 79 and secure the lateral mold sections 70 in a closed annular form.

Rigidly affixed to both sides of the chamber 90, in the area below projecting ears 93 and 96 are fastening plates 100. The fastening plates are rigidly affixed by bolts 101 to split bearing means 102 which are slidably affixed or mounted on transverse rods 20 by additional fastening means 103.

Referring now to Figs. 1 and 2, the means for moving lateral sections 70 in an axial direction along transverse rods 20 away from each other includes the single cylinder 105. The cylinder 105 has a piston shaft 106 which is rotatably fastened by clevis 107 to a horizontal linkage bar 108. The other end of cylinder 105 is rotatably fastened by clevis 109 to a second horizontal linkage bar 108. The horizontal linkage bars are pivotally connected at each end to vertical operating arms 110. Each pair of vertical operating arms 110 are pivotally connected at their upper ends by bar and pin linkages 111 to a pair of projecting ears 112 which are affixed, one pair each, at right angles to the outside surface of bottom outer heating chambers 90. The operating arms 110 rotate on shafts 113 which extend at right angles across support plates 23 and 24. Collars 114 are provided to fasten arms 110 to the ends of the shafts 113. When cylinder 105 is actuated so as to retract piston shaft 106, the operating arms 110, rotating on shafts 113, will cause the lateral sections 70 to move away from each other and the medial section 30. Movement of the lateral sections toward each other is accomplished by end cylinders to be described.

*End closures*

The end closures 120 are circular axially recessed closure plates that interfit the inner perimeters of the lateral mold sections 70 and are rigidly affixed to the cylinders 25 which are mounted in end frames 15 and 16. In the preferred embodiment shown, the two end closures 120 are similar with each other so that the two closures will be described as one, with any variances in common structure being appropriately designated.

Referring now to Fig. 5, between each lateral mold section 70 and its closure plate 120 is a molding cavity 122 for one bead portion 11 of the work structure 10. That part of a closure 120 which is in actual contact with bead 11 as a molding surface is the bead clamp ring 123. The bead clamp ring 123 has a molding surface 124 to form the sealing ribs, is annular in shape and has a circumferential flange 125 which is tapered on the outer periphery 126 so as to readily slide past the outer portions of article 10 and center the article within the mold prior to closing all of the mold sections.

The bead clamp rings 123 are affixed to backup plates 127 by fastening means 128. The backup plates 127 have a cylindrical countersunk bore 127a at the inside center thereof so as to ensure that rings 123 are accurately aligned with sections 71. The backup plates also have three circular projections 130, spaced on centers 120° apart, on the back or outside thereof. Affixed to the projections 130 by bolts 131 are two cylinder attaching plates 132. The piston shafts 27 of cylinders 25 are fastened through plates 132 by fastening means 134.

Referring now to Fig. 1, the means for moving end closures 120 in an axial direction toward each other and into alignment with lateral sections 70, and further moving the lateral sections into alignment with the fixed medial mold section 30 includes the two cylinders 25. The movements of the two cylinders are coordinated by two pairs of equalizing arms 135. Each pair of equalizing arms contacts the outer surface of backup plate 129 by means of a roller 136 which is rotatably mounted on a pin 137 affixed through the rounded upward end of arms 135. The roller 136 is confined against the backup plate by the inner surface of the cylinder attaching plate 132. The lower section of each backup plate 129 has a guideway 138 therein which conforms to the length of roller 136.

Referring now to Figs. 1 and 4, each pair of equalizing arms 135 are joined near the bottom by a horizontal tubular shaft 139 which rotates on shaft 140 affixed to support plates 23 and 24. Rigidly affixed to each shaft 139 are equalizing gear segments 141 which have intermeshing teeth 142 located at the transverse center line of the press. Thus any movement of either end closure 120 is transmitted through roller 136 to the arms 135 and then through teeth 142 to the opposite arms, roller and end closure. This ensures that the two end closures and lateral mold sections move at uniform speeds toward and away from the medial mold section.

Referring again to Fig. 5, the left hand end closure 120 has fittings 143 and 144 connected into apertures 145 and 146 in bead clamp ring 123 leading to the interior of the mold. The fittings 143 and 144 are connected to piping 147 for the admission into the interior of the distended work structure 10 of air, steam and water, as desired.

*Safety device*

To insure the safety of the operator, a safety device 150 is provided and comprises an L-shaped rectangular structure 151 which is best shown in Figs. 1 and 2. Structure 151 is supported by a long shaft 152 which is rotatable in brackets 153 and 154 affixed to supports 23 and 24. Affixed to shaft 152 is a long rectangular handle 155 extending up toward the front of the apparatus. The part 151 normally occupies the position shown in Fig. 4 with the outer end of lever 155 resting on pin 157. When the cylinders 43 and 83 have been actuated to open the mold cavity, the rear locking levers 45 and 85 will have rotated down and inward toward structure 151. When this happens, a locking surface 156 on levers 45 and 85 will have passed within the structure 151 which will yield to let the projections pass. The mold sections can then not close until handle 155 is raised, permitting the surface 156 to pass the structure 151. The machine is set in motion by the operator pressing a button with one hand and as he has to use the other hand to raise the lever 155, both hands will be occupied when the press is closed.

*Operation*

It is believed that the operation of the press will have been understood from the foregoing and only a brief resume thereof is necessary. The timing mechanism for controlling the various movements is not shown but will be understood by those skilled in the art.

The press being open with the end closures 120 spaced apart and the lateral sections 70 spaced from the central mold section 30 and the upper swinging halves of the central and lateral sections raised, the operator places the uncured cylinder 1 in the press with the enlarged beads 2 on either side of the lower sections 71b and with the center resting in the central section 31b. With one hand he lifts the lever 155 and with the other, transfers the starting valve which actuates the cylinders 43 and 83 which closes the central and lateral mold sections around the cylinder 1 as shown in Fig. 7.

The next sequence admits fluid pressure to the cylinders 25 which moves the end closures 120 against the lateral sections 70 which first grips the two beads 2 in the end of the cylinder 1, as shown in Fig. 8. Continued movement of the end closures causes the lateral sections 70 to approach the central section as shown in Fig. 9. At this time, steam or air under pressure will be admitted through the conduits 143 and 144 which will initiate the shaping of the cylinder 1. The inward movement of the lateral mold sections is against the pressure in the cylinder 105 and the uniform movement is assured by the intermeshing gear segments 142.

When the press is fully closed as shown in Fig. 5, the timer starts and vulcanization will proceed until the alotted time has expired, when cooling water may be circulated through the article. Thereupon the timer will reverse the cylinders 25, 43 and 83 and the mold sections will spread apart, and the top mold sections raise so the completely vulcanized article 10 may be removed therefrom. A hand valve is then operated to spread the lateral sections to their required distances from the central mold section.

This completes the cycle. It will be seen that a press has been devised which is peculiarly adapted to the shaping and vulcanizing of air springs of the type shown herein, but the principles of the invention may be adapted to other specific purposes.

There is disclosed and claimed herein one embodiment of the present invention. It will be obvious to those skilled in the art that there are many modifications of the apparatus disclosed which may be constructed and still be within the scope of the present invention. Therefore, the appended claims are intended to cover all such changes and modifications as reasonably appear to fall within the scope and spirit of the present invention.

What is claimed is:

1. In apparatus for the shaping and curing of hollow structures of rubberized fabric construction, the combination of: a frame including vertical end members connected by at least one pair of transverse rods; a pair of cylinders mounted one in each of said end frames, each of said cylinders having an inwardly extensible piston rod; a series of axially separable annular mold sections supported by said transverse rods between said piston rods adapted for receiving an unshaped and uncured structure; means normally positioning said mold sections in an axially separate relation; an end closure plate attached to each of said piston rods outwardly of said mold sections; said mold sections and closure plates defining a mold cavity when fully closed together by an inward extension of said piston rods; means for equalizing the inward movement of said piston rods; means for admitting a vulcanizing fluid into the interior of a structure within said mold sections before said mold cavity is fully defined; and additional means operable when the mold cavity is fully defined for further controlling admission of said vulcanizing fluid.

2. In apparatus for the shaping and curing of hollow structures of rubberized fabric construction, the combination of: a frame including vertical end members connected by at least one pair of transverse rods; a pair of cylinders mounted one in each of said end frames, each of said cylinders having an inwardly extensible rod; a stationary medial mold section and a lateral mold section at each side of said medial section, said mold sections being supported by said transverse rods between said piston rods and axially separable for receiving an unshaped and uncured structure; means normally positioning said mold sections in an axially separate relation; and an end closure plate attached to each of said piston rods axially and outwardly of said mold sections; said mold sections and closure plates defining a mold cavity when fully closed together by an inward extension of said cylinder rods; means for equalizing the inward movement of said piston rods; means for admitting a vulcanizing fluid into the interior of a structure within said mold sections before said mold cavity is fully defined; and, additional means operable when the mold cavity is fully defined for further controlling admission of said vulcanizing fluid.

3. In apparatus for the shaping and curing of hollow structures of rubberized fabric construction, the combination of: a frame including vertical end members connected by at least one pair of transverse rods; a pair of cylinders mounted one in each of said end frames, each of said cylinders having an inwardly extensible rod; a stationary medial mold section and a lateral mold section at each side of said medial section, said mold sections being supported by said transverse rods between said piston rods and axially separable for receiving an unshaped and uncured structure; a second cylinder normally positioning said mold sections in an axially separate relation; and end closure plate attached to each of said piston rods axially and outwardly of said mold sections; said mold sections and closure plates defining a mold cavity when fully closed together by an inward extension of said piston rods; means for equalizing the inward movement of said piston rods; means for admitting a vulcanizing fluid into the interior of a structure within said mold sections, before said mold cavity is fully defined; and additional means operable when the mold cavity is fully defined for further controlling admission of said vulcanizing fluid.

4. Apparatus in accordance with claim 2 wherein said means for equalizing the inward movement of said piston rods includes a pair of downwardly curved arms, each of said arms being pivotally mounted through the medial portion thereof to said frame, the lower ends of said arms having intermeshed teeth, and the upper ends of said arms being slidably connected one to each of said end closure plates.

References Cited in the file of this patent

UNITED STATES PATENTS

| | | |
|---|---|---|
| 1,167,009 | Nall | Jan. 4, 1916 |
| 1,637,465 | Bierman | Aug. 2, 1927 |
| 1,887,250 | Stricklen et al. | Nov. 8, 1932 |
| 1,990,455 | Kraft | Feb. 5, 1935 |
| 2,265,346 | Brown et al. | Dec. 9, 1941 |
| 2,363,107 | Young | Nov. 21, 1944 |